United States Patent [19]
Gibson et al.

[11] 3,947,559
[45] Mar. 30, 1976

[54] ALKALI METAL DITHIONITE MANUFACTURE

[76] Inventors: Geoffrey Moorhouse Gibson, 623 Stonegate Road, Leeds, England, LS17 6EJ; John Crowder, 82 Lordswood Road, Birmingham 17, England

[22] Filed: Mar. 29, 1974

[21] Appl. No.: 455,980

[30] Foreign Application Priority Data
  Mar. 30, 1973  United Kingdom............... 15386/73
  July 17, 1973  United Kingdom............... 33969/73

[52] U.S. Cl. .............................................. 423/515
[51] Int. Cl.² .......................................... C01B 17/66
[58] Field of Search ................................... 423/515

[56] References Cited
UNITED STATES PATENTS

| | | | |
|---|---|---|---|
| 2,010,615 | 8/1935 | Vanderbilt | 423/515 |
| 3,576,598 | 4/1971 | Plentovich | 423/515 |
| 3,826,818 | 7/1974 | Heitman | 423/515 |
| 3,839,218 | 10/1974 | Owen | 423/515 X |

FOREIGN PATENTS OR APPLICATIONS

| | | | |
|---|---|---|---|
| 1,148,248 | 4/1969 | United Kingdom | 423/515 |

*Primary Examiner*—L. Dewayne Rutledge
*Assistant Examiner*—Arthur J. Steiner
*Attorney, Agent, or Firm*—Dennison, Dennison, Meserole & Pollack

[57] ABSTRACT

A process for making an alkali metal dithionite by reacting sulphur dioxide with a basic alkali metal compound and one or both of formic acid and an alkali metal formate. The process is conducted in the presence of aqueous 2-methoxyethanol.

17 Claims, No Drawings

ALKALI METAL DITHIONITE MANUFACTURE

FIELD OF THE INVENTION

This invention relates to the manufacture of alkali metal dithionites.

DESCRIPTION OF THE PRIOR ART.

It is known that formic acid will react with an alkali metal bisulphite to form an alkali metal dithionite according to the equation:

$$2NaHSO_3 + HCO_2H = Na_2S_2O_4 + CO_2 + 2H_2O$$

and several manufacturing procedures have been proposed (e.g. in U.S. Pat. No. 2,010,615, and U.K. patent specifications No. 1,148,248, 1,286,915 and 1,312,329) in which an alkali metal formate is reacted in aqueous/alcoholic solution with sulphur dioxide and a basic alkali metal compound thereby forming in situ bisulphite and formic acid for reaction according to the above equation. The alcohols suggested for use in these procedures are lower aliphatic alcohols such as methanol, ethanol and propanol and methanol is generally preferred. The preferred reaction temperatures are such that superatmospheric pressures are necessary.

SUMMARY OF THE INVENTION

We have now discovered a process of manufacturing alkali metal dithionites utilising the aforesaid reaction between bisulphites and alkali metal formates which dispenses with the need for superatmospheric pressures whilst providing results comparable with or better than those given by the previous procedures.

Accordingly, the invention provides a process of preparing an alkali metal dithionite which comprises forming a reaction mixture comprising formic acid or an alkali metal formate or both, sulphur dioxide and a basic alkali metal compound, all in solution or suspension in aqueous 2-methoxyethanol and causing said mixture to react thereby producing anhydrous alkali metal dithionite salt.

The novel process may be carried out according to several alternative procedures such as those suggested in the aforesaid prior publications in respect of the other alcohols.

The novel process may be conducted according to several alternative procedures. For example, sulphur dioxide may be introduced as such or produced in situ by the addition of a compound (for example sodium pyrosulphite, sodium metabisulphite or sodium sulphite) which produces sulphur dioxide under the reaction conditions. Also, the sequence and mode of addition of the reactants to the reaction vessel may be varied according to several permutations. Thus, SO₂ (as such or as pyrosulphite, metabisulphite or sulphite) may be added concurrently or sequentially in either order with formic acid or formate to the alkali species. Alternatively all three reactants may be added, possible with premixing of two (or less preferably all three) of them, to the methoxyethanol. Methoxyethanol may also be present in any of the individual streams added to the reaction mixture according to any of these possible procedures.

For best yields it is desirable to ensure that the reaction proceeds as rapidly as possible but the use of high reaction temperatures makes for decomposition of the already formed dithionite. Although direct addition of liquid or gaseous sulphur dioxide to the reaction mixture is not excluded, it is preferred, in order to keep the acidity of the reaction mixture to a minimum, to add the sulphur dioxide as a solution in 2-methoxyethanol, or a mixture of 2-methoxyethanol and water, to the mixture whilst reaction is proceeding and at a rate such that the sulphur dioxide is absorbed as fast as it is added and does not escape from the reaction system. A convenient method of carrying out the reaction is to add both a stream of sulphur dioxide solution and a stream of an aqueous, aqueous/methoxyethanolic, or methoxyethanolic solution or slurry of basic alkali metal compound to a solution or slurry of alkali metal formate or formic acid in water, aqueous methoxyethanol or methoxyethanol. Alternatively, streams of sulphur dioxide or sulphur dioxide solution and a solution or slurry of basic alkali metal compound and alkali metal formate or formic acid may be added to a reservoir of the 2-methoxyethanol. The reactant streams may be introduced by dropwise addition or in the form of a fine stream. Alternatively small amounts of the components can be added intermittently.

Suitable basic alkali metal compounds are hydroxides, carbonates or sulphites. Hydroxides are generally preferred. The process of the invention will normally be applied to the preparation of sodium dithionite so that in the preferred case the alkali metal reactants will be sodium hydroxide and sodium formate.

The preferred reaction temperature is in the range 60° to 90°C, most preferably 70° to 85°C. In one convenient procedure an initial formate slurry is formed at ambient temperature, the temperature increased to within the range 70° to 85°C, and the reaction is carried out at the increased temperature.

The proportions of reactants will be determined by the stoichiometry of the reaction. Preferably the sulphur dioxide is used in 20–35% by weight solution in 2-methoxyethanol. Where sodium hydroxide is added separately to the mixture this is preferably as a 40–50% by weight aqueous solution. Preferably an excess of formate (whether as formic acid or formate) over the stoichiometric requirement is used. The formate is preferably a 25–40% slurry in methoxyethanol/water mixture comprising from 5–50%, preferably 8 to 35% by weight of water. A 20 to 40% excess of formic acid or formate over the sulphur dioxide has been found convenient.

To minimise the reaction volume when employing formic acid, the formic acid is preferably added in as concentrated form as possible, most preferably as a 50 to 98% by weight aqueous solution.

Processes in which formic acid is present ab initio in the reaction vessel are less preferred since the resulting high initial acidity may lead to decomposition of dithionite. Preferred alkalis for present use include sodium hydroxide and sodium carbonate.

The reaction is preferably conducted in nitrogen or other inert atmosphere.

Alkali metal dithionite product of the process of the invention if precipitated from the reaction mixture and may be recovered by filtration washing with methanol and drying; 2-methoxyethanol and methanol can be recovered from the filtrate and washings and re-used.

The invention is illustrated by the following examples.

EXAMPLE 1

A slurry of 160g (2.35 moles) sodium formate, 240g. methoxyethanol and 120 g. water was charged into the reaction vessel and heated up to 75°C with stirring under reflux in an inert atmosphere ($N_2$). To the stirred slurry was added a solution of 60g. (1.5 moles) sodium hydroxide in 70g. water concurrently with a solution of 196g. (3.06 moles) sulphur dioxide in 610g. methoxyethanol. The sulphur dioxide solution was added at a uniform rate over 1 hour and the alkali at such a rate that the first 30% was added 2½ times as fast as the remaining 70%, the total time of addition being 1 hour. When addition was complete, the product was stirred at 75°C for 2½ hours, filtered off under an inert atmosphere, washed with 200g. methanol at a temperature above 60°C, and then dried. The white solid obtained weighed 241.6g and contained 93.6% sodium dithionite, $Na_2S_2O_4$. The yield as $Na_2S_2O_4$ was 86.2% calculated on the sulphur dioxide.

For comparison, four comparative experiments were carried out under substantially identical conditions to Example 1 but employing methanol, ethanol, and ethanol/ethylene glycol mixture and 2-ethoxyethanol respectively as the solvent alcohols. Details of the experiments are given below. It will be seen that none of these alcohols give results approaching those of Example 1.

EXPERIMENT 1

A slurry of 160g (2.35 moles) sodium formate, 240g methanol and 120g water was charged into the reaction vessel and heated up to 65°C with stirring under reflux in an inert atmosphere ($N_2$). To the stirred slurry was added a solution of 60g. (1.5 moles) sodium hydroxide in 70g water concurrently with a solution of 200g. (3.13 moles) sulphur dioxide in 610g methanol. The sulphur dioxide solution was added at a uniform rate over 1 hour and the alkali at such a rate that the first 30% was added 2½ times as fast as the remaining 70%, the total time of addition being 1 hour. During the reaction the refluxing temperature rose to 70°C. When addition was complete the product was stirred at 70°C for 2½ hours, filtered off under an inert atmosphere, washed with 200g methanol at a temperature above 60°C and then dried. The white solid obtained weighed 147.7g and contained 64.8% sodium dithionite, $Na_2S_2O_4$. The yield as $Na_2S_2O_4$ was 38.7% calculated on the sulphur dioxide consumed.

EXPERIMENT 2

A slurry of 160g (2.35 moles) sodium formate, 240g ethanol (74°o.p. industrial methylated spirit) and 120g water was charged into the reaction vessel and heated up to 75°C with stirring under reflux in an inert atmosphere ($N_2$). To the stirred slurry was added a solution of 60g (1.5 moles) sodium hydroxide in 70g water concurrently with a solution of 200g (3.13 moles) sulphur dioxide in 610g ethanol. The sulphur dioxide solution was added at a uniform rate over 1 hour and the alkali at such a rate that the first 30% was added 2½ times as fast as the remaining 70%, the total time of addition being 1 hour. The temperature was kept at 75°C at all times. A sticky solid was formed initially but this quickly dispersed to give a normal-looking white solid. The mixture was stirred at 75°C for 2½ hours after addition was complete and then filtered off under an inert atmosphere, washed with 200g methanol at a temperature above 60°C and finally dried. The white solid obtained weighed 211.9g and contained 70.7% sodium dithionite, $Na_2S_2O_4$. The yield as $Na_2S_2O_4$ was 58.6% calculated on the sulphur dioxide consumed.

EXPERIMENT 3

A slurry of 160g (2.35 moles) sodium formate, 180g ethanol (74°o.p. industrial methylated spirit) 60g ethylene glycol and 120g water was charged into the reaction vessel and heated up to 80°C with stirring under reflux in an inert atmosphere ($N_2$). To the stirred slurry was added a solution of 60g (1.5 moles) sodium hydroxide in 70g water concurrently with a solution of 200g (3.13 moles) sulphur dioxide in a mixture of 457g ethanol and 153g ethylene glycol. The sulphur dioxide solution was added at a uniform rate over 1 hour and the alkali at such a rate that the first 30% was added 2½ times as fast as the remaining 70%, the total time of addition being 1 hour. When addition was complete the product was stirred at 80°C for 2½ hours, filtered off under an inert atmosphere, washed with 200g methanol at a temperature above 60°C and then dried. The white solid obtained weighed 212.7g and contained 82.3% sodium dithionite, $Na_2S_2O_4$. The yield as $Na_2S_2O_4$ was 67.0% calculated on sulphur dioxide consumed.

EXPERIMENT 4

A slurry of 160g (2.35 moles) sodium formate, 240g 2-ethoxyethanol and 120g water was charged into the reaction vessel and heated up to 75°C with stirring under reflux in an inert atmosphere ($N_2$). To the stirred slurry was added a solution of 60g (1.5 moles) sodium hydroxide in 70g water concurrently with a solution of 200g (3.13 moles) sulphur dioxide in 610g ethoxyethanol. The sulphur dioxide solution was added at a uniform rate over 1 hour and the alkali at such a rate that the first 30% was added 2½ times as fast as the remaining 70%, the total time of addition being 1 hour. A white solid was formed at first but this soon evolved gas and yielded a yellow-looking product which coagulated to a pasty mass which swirled round the bottom of the reaction vessel. The mixture was stirred at 75°C for 2½ hours. Great difficulty was encountered in filtering off the product. Much of the white filter-cake was dissolved on washing with 200g methanol at a temperature above 60°C and the very low yield of final product could not be dried satisfactorily. Ethoxyethanol was obviously not a suitable solvent.

EXAMPLE 2

A slurry of sodium formate (122 g 1.80 moles) in 2-methoxyethanol (330g) and water (30g) was stirred at 75°C in a 2-litre flask under a reflux condenser in an atmosphere of nitrogen. Solutions of sulphur dioxide (200g 3.12 moles) in 2-methoxyethanol (400g) and sodium hydroxide (60g 1.50 moles) in water (70g), were then added concurrently, such that the sulphur dioxide flowed in at uniform rate for 2 hours and the first 30g of the caustic soda flowed in at 2.5 times the rate of the remaining 70%, the total alkali addition time being 2 hours. The temperature was kept at close as possible to 75°C during the addition, and heating and stirring were continued at this temperature for a further 2.5 hours after the addition was complete.

The product was filtered off in an inert atmosphere, washed with 200g of methanol at a temperature above 60°C, and then dried. The white solid obtained weighed 242 g and contained 91.5% of $Na_2S_2O_4$. The yield as $Na_2S_2O_4$ was 82.8% calculated on the sulphur dioxide.

EXAMPLE 3

A mixture of sodium hydroxide (120g, 3.0 moles), sodium formate (20.4g, 0.3 mole), 2-methoxyethanol (330g), and water (100g) was stirred under reflux in an atmosphere of nitrogen at 75°C. Formic acid (98%, 70.4g, 1.5 moles) and a solution of sulphur dioxide (200g, 3.12 moles) in 2-methoxyethanol (400g) were added uniformly and concurrently over 1 hour, the temperature being kept at 75°C — initially by applied cooling.

When addition was complete the product was stirred at 75°C for 2.5 hours and then filtered in an atmosphere of nitrogen. The solid was washed on the filter with hot methanol (200g) and then dried. The cream-coloured dry product (226.0g) contained 90.3% of sodium dithionite, $Na_2S_2O_4$. The yield as $Na_2S_2O_4$ was 77.0% calculated on the sulphur dioxide.

EXAMPLE 4

Anhydrous sodium carbonate (159g, 1.5 moles) was added to a mixture of sodium formate (20.4g, 0.3 mole) 2-methoxyethanol (330g) and water (100g) preheated to a temperature just above 40°C. The mixture was then treated with formic acid and sulphur dioxide/2-methoxyethanol solution at 75°C and worked up, all exactly as in Example 1.

The final white product (234.6g) contained 91.7% of sodium dithionite, $Na_2S_2O_4$. The yield as $Na_2S_2O_4$ was 81.4% calculated on the sulphur dioxide.

EXAMPLE 5

A mixture of 2-methoxyethanol (330 g) and water (30 g) was heated to 40°–45° in a 2-liter flask, and anhydrous solution carbonate (96 g., 0.91 mole) then; suspended therein. The slurry was stirred under reflux and formic acid (98%, 84.9g, 1.81 moles) added gradually during 30 minutes with appropriate cooling to prevent the temperature from exceeding 70°C or so.

When addition of formic acid was complete, a hydrogen peroxide trap was attached to the top of the reflux condenser (for determination of unabsorbed sulphur dioxide by alkali titration) and a slow current of nitrogen passed through the system.

Solutions of sulphur dioxide (195 g, 3.05 moles) in 2-methoxyethanol (400 g) and sodium hydroxide (60g, 1.50 moles) in water (70g), were then added concurrently. The sulphur dioxide solution was added at a uniform rate during 2 hours through a tube which dipped below the surface of the reaction mixture. The caustic soda solution was added at such a rate that the first 30% was added 2.5 times as fast as the remaining 70%, the total time of addition being 2 hours. The temperature was kept at 75°C throughout. After the addition was complete, stirring under reflux in nitrogen atmosphere at 75°C was continued for another 2.5 hours.

The product was filtered off in an inert atmosphere, washed with 200 g of methanol at a temperature above 60°C, and then dried. The white solid obtained weighed 240.3g and contained 95.7% of $Na_2S_2O_4$. The yield as $Na_2S_2O_4$ was 88.1%, calculated on the sulphur dioxide consumed. Unabsorbed sulphur dioxide amounted to 0.8g.

We claim:

1. In a process for preparing an anhydrous alkali metal dithionite which comprises forming a reaction mixture consisting essentially of one or both of formic acid and an alkali metal formate, sulphur dioxide, and a basic alkali metal compound, all in solution or suspension in a liquid reaction medium and causing said mixture to react thereby producing anhydrous alkali metal dithionite salt, the improvement which comprises performing the reaction in a medium consisting essentially of 2-methoxyethanol.

2. A process as claimed in claim 1, wherein the sulphur dioxide is introduced into the reaction mixture concurrently with the formic acid or formate.

3. A process as claimed in claim 1 wherein the sulphur dioxide is introduced into the reaction mixture sequentially with the formic acid or formate.

4. A process as claimed in claim 1 wherein the sulphur dioxide is introduced in the form of a sulphur compound that produces sulphur dioxide under the reaction conditions.

5. A process as claimed in claim 1, wherein at least one of the reactants is pre-mixed with 2-methoxyethanol.

6. A process as claimed in claim 5, wherein the sulphur dioxide is introduced as a solution in 2-methoxyethanol or a mixture of 2-methoxyethanol and water.

7. A process as claimed in claim 6, wherein the sulphur dioxide is used in 20 to 35% by weight in solution in 2-methoxyethanol.

8. A process as claimed in claim 1 wherein the sulphur dioxide is introduced into the reaction mixture while the reaction is proceeding and at a rate such that the sulphur dioxide is absorbed as fast as it is added.

9. A process as claimed in claim 1, wherein a stream of sulphur dioxide solution and a stream of an aqueous, aqueous/methoxyethanolic, or methoxyethanolic solution or slurry of basic alkali metal compounds are simultaneously added to a solution or slurry of alkali metal formate or formic acid in water, aqueous methoxyethanol or methoxyethanol.

10. A process as claimed in claim 1, wherein a stream of sulphur dioxide or sulphur dioxide solution and a stream of solution or slurry of basic alkali metal compound and alkali metal formate or formic acid are added to a reservoir of the 2-methoxyethanol.

11. A process as claimed in claim 1 wherein the reaction temperature is in the range 60°–90°C.

12. A process as claimed in claim 1 wherein the basic alkali metal compound is sodium hydroxide and is added separately to the reaction mixture as a 40 to 50% by weight aqueous solution.

13. A process as claimed in claim 1 wherein alkali metal formate is used as a 25 to 40% slurry in a methoxyethanol/water mixture comprising 5 to 50% by weight of water.

14. A process as claimed in claim 1 wherein alkali metal formate is used as a 20 to 40% excess over the sulphur dioxide.

15. A process as claimed in claim 1 wherein formic acid is introduced in concentrated aqueous solution containing 50 to 98% by weight of formic acid.

16. A process as claimed in claim 1, wherein the reaction is conducted in an inert atmosphere.

17. A process as claimed in claim 1, wherein the alkali metal dithionite product is recovered from the reaction mixture by filtration washing with methanol and dried.

* * * * *